United States Patent
Nuhfer

(10) Patent No.: US 10,395,496 B2
(45) Date of Patent: Aug. 27, 2019

(54) ALARM AND SURVEILLANCE SYSTEM AND METHOD

(71) Applicant: Ryan L Nuhfer, Warren, PA (US)

(72) Inventor: Ryan L Nuhfer, Warren, PA (US)

( * ) Notice: Subject to any disclaimer, the term of this patent is extended or adjusted under 35 U.S.C. 154(b) by 139 days.

(21) Appl. No.: 14/743,173

(22) Filed: Jun. 18, 2015

(65) Prior Publication Data

US 2016/0371948 A1 Dec. 22, 2016

(51) Int. Cl.
*H04N 7/18* (2006.01)
*G08B 13/196* (2006.01)

(52) U.S. Cl.
CPC . *G08B 13/19667* (2013.01); *G08B 13/19656* (2013.01); *H04N 7/188* (2013.01)

(58) Field of Classification Search
CPC ........ G08B 13/19667; G08B 13/19656; H04N 7/188
USPC .................. 348/143, 159; 340/501; 386/280; 714/6.11; 345/1.1; 709/201
See application file for complete search history.

(56) References Cited

U.S. PATENT DOCUMENTS

| | | | | |
|---|---|---|---|---|
| 7,779,086 | B1* | 8/2010 | Gammo | H04L 29/12113 709/201 |
| 8,878,931 | B2* | 11/2014 | Masters | H04N 5/247 348/143 |
| 2006/0195716 | A1* | 8/2006 | Bittner | G08B 13/19656 714/6.11 |
| 2011/0299835 | A1* | 12/2011 | Fleming | H04N 5/77 386/280 |
| 2012/0206317 | A1* | 8/2012 | Wong | G06F 21/10 345/1.1 |
| 2013/0329052 | A1* | 12/2013 | Chew | H04N 7/181 348/159 |
| 2015/0116107 | A1* | 4/2015 | Fadell | G08B 19/005 340/501 |

\* cited by examiner

*Primary Examiner* — Jayanti K Patel
*Assistant Examiner* — Richard B Carter
(74) *Attorney, Agent, or Firm* — Rebecca M. Tapscott; The Bilicki Law Firm, PC

(57) ABSTRACT

An alarm and surveillance system is provided for monitoring a location and for generating real-time data when an alarm is triggered. The system includes an alarm, a camera, and a DVR recording device which provides data to a server based system which distributes the data to a first responder. The first responder is provided with real-time information of the event location prior to arrival on the scene.

11 Claims, 7 Drawing Sheets

ALARM AND SURVEILLANCE SYSTEM AND METHOD

BRIEF SUMMARY

Figure 1:
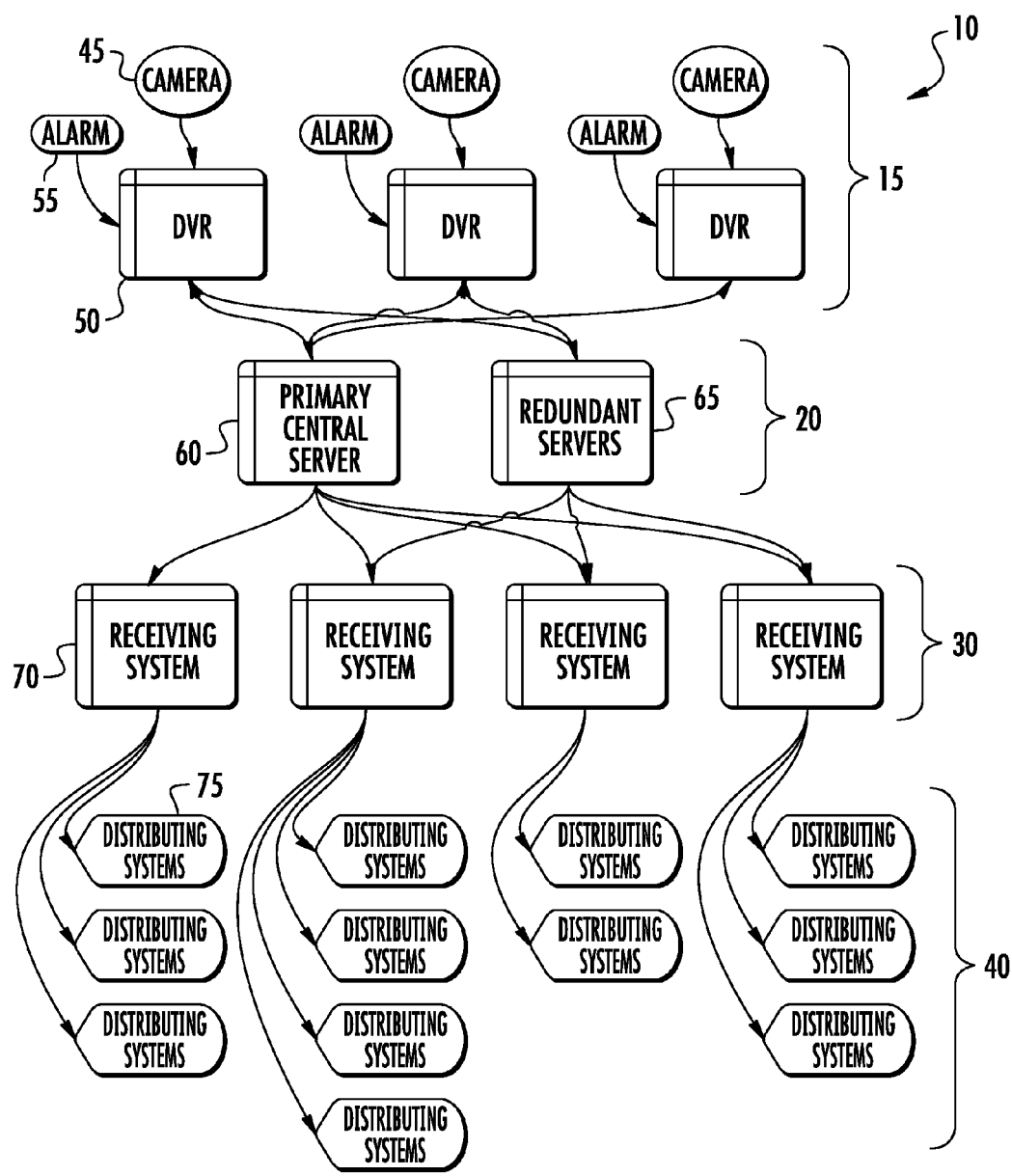
FIG. 1 is an overview of an alarm and surveillance system.

An alarm and surveillance system is provided for alerting designated users of an event occurrence. The system includes a client set with an alarm, an image capture device, and recording device. A central server including a primary server and redundant servers is also provided. A receiving set including at least one receiving system is included for translating messages from the central server. Further, a distributing set is included having at least one device for displaying messages viewable by the designated user.

DESCRIPTION OF THE EMBODIMENTS

In accordance with embodiments of the invention, an alarm and surveillance system 10 includes the following components: 1.) A client set 15 including an alarm, a DVR, and a network of cameras; 2.) a handling set 20 including a central server and redundant servers; 3.) a reception set 30 including a set of receiving systems; and 4.) a distribution set 40 including a set of distribution systems.

In particular, system 10 includes client set 15 including one or more cameras, one of which is indicted at 45. In some embodiments, a plurality of cameras may form a network of cameras. Each camera 45 may be firmly mounted in one position to cover one specific area or may be mounted on a movable platform in order to pivot or rotate on a fixed mounting, to tilt up and down, to rotate around an axis, or the like. Such motion may be performed automatically in a field at given time interval or at a random time interval. Each camera 45 may also be able to zoom in to produce a closer view of an event or area of to zoom out to reveal a more inclusive view of the event or area. Such zooming may be manually controlled from a remote location or performed automatically according to a set or random schedule.

In some embodiments, each camera 45 feeds data to a dedicated digital video recorder (DVR) 50 in a one camera 45 per DVR 50 arrangement. Alternately, a plurality of cameras 45 may feed data to one DVR 50 such that a single DVR 50 records simultaneous data from a plurality of cameras 45. Thus, all camera data may be displayed on a monitor in different sections of the screen. Alternately, different camera data may buffered temporarily and then be sequentially placed onto the DVR one after the other. DVRs 50 may be chosen so that the system software can be easily modified and may serve a traditional purpose of recording and broadcasting a video feed provided by a camera. DVRs 50 may also be connected directly with the central systems in order to properly sign and transmit specific signals to the central systems, to await a response from the central servers, or to respond accordingly to messages sent from the central servers.

The client set 15 also includes one or more alarms, one of which is indicated at 55. In some embodiments, a series of alarms 55 may be used. Alarms 55 may be any alarm typically know or used in the art, and may be configured in such a way so as to ensure that a message is properly transmitted. Alarm 55 may be triggered manually by a person on the scene of the event or may be triggered automatically by a detector such a smoke detector, a fire detector, a motion detector, a door or window opening detector, a an electric eye or any other such detection device.

The handling set 20 includes a primary central server 60. The handling set may also contain at least one or more redundant servers 65. The redundant server may perform two key functions. A first function may be to continually verify the functionality and integrity of the central server. A second function may be to continually receive and verify, but not otherwise handle, incoming messages from DVRs.

Primary central server 60 properly handles the processing and forwarding of messages from DVRs 50 on the sending end of alarm and surveillance system 10. Primary central server 60 authenticates a signature, processes the signature through a database, collects logistical data on the sending party, and determines the proper set of systems to which to forward the message. The primary server also serves to forward the message to the set of systems and to defend access to all DVRs included within the A.L.E.R.T. system. The electronic signature is generated and authenticated by alarm and surveillance system 10. The signature is processed through the database. The central server will maintain a database of key value pairs to store public keys associated with known machines. A private key stored on the sending device, such as DVR 50, will be used to encrypt a message transmitted to primary central server 60. The message will be signed with DVR's identity, and a separate decryption key. The task of defending access to all DVRs included within alarm and surveillance system 10 may be partly achieved by designating primary central server 60 as the only system capable of accessing any DVR 50 included in alarm and surveillance system 10. Central server 60 may require a set of continually cycling security credentials from any system wishing to gain access to a particular DVR 50. Further, central server 60 deciphers and properly direct messages received by the system. In particular, central server 60 processes messages through a decryption and filtration mechanism.

Upon receipt of a message, primary central server 60 will use a database to look up the public key associated with the incoming address, and will subsequently use this key to decrypt the message. Primary central server 60 will then check the identity portion of the message's signature against sending DVR's announced identity. If these are equal, each of the signature, message, and machine will be considered authentic. The same process may be performed by at least one of redundant servers 65.

The central server's database may store data associated with known DVRs in several tables. An association may be made through the DVR's identity. The data itself may be encrypted, and primary central server 60 may use the decryption key encoded in the message's signature in order to obtain information associated with the sending DVR 50. Central server 60 may also store data pertinent to the operation of the system such as a list of available first responder teams, associated geographical coordinates of the responders, and the location of the sending DVR 50.

Information extracted from the database using the signature may include logistical information relating to the sending DVR and a list of receiving systems to which the message may be forwarded. The list of receiving systems may be configured from a user interface by alarm and surveillance system 10 administrators, who themselves may choose a list of recipients to whom messages from a particular account may be forwarded. Each recipient on the list may be associated with an account through alarm and surveillance system 10, which may also provide the necessary information for routing messages to the recipient.

The database storing associations between DVR identifications and public keys may also itself be encrypted, and no other trace of identification for known DVRs may exist within the system. Primary central server 60 may be incapable of extracting information associated with a DVR's identity when no signature is present. In this way, during a security breach, the attacker will likely have no plausible way of accessing a list of associated machines.

Central server 60 receives a message from DVR 50 which contains an associated identity. This identity may be paired with a public key within central server 60, which looks up the public key using the identity associated with the message, and use the public key to decrypt the message. The contents of the message will be used to extract relevant data from the database. The forwarding of messages will occur much in the same way that the messages were sent by the DVR; using an information packet, along with a signature, and a list of recipients to which the message may be forwarded.

Central server 60 may operate on one of a number of Unix-based systems, which are equipped with authentication protocol suitable for verifying incoming signatures. The system may use encryption algorithms such as, but not limited to RSA, which uses a public key to encrypt and a private key to decrypt. The public and private key pairs are stored as text files and may be suitable for any system with the ability to store, transmit, and operate on data. Such key pairs may utilize to authenticate systems.

Redundant servers 65 function to verify signatures. In particular, redundant servers 65 have the capability to receive messages, and may thus verify signatures. If redundant servers 65 unanimously deem a signature to be inauthentic, and simultaneously witness primary central server 60 to verify such a signature, redundant servers 65 may then designate a selected successor server as the primary server at which time the current primary server may undergo an automatic investigation by the group of redundant servers. These functionalities pertain primarily to the redundant servers, which serve as secondary functionalities of the central server.

Thus, signature and feed may either be accepted or rejected by the central servers. Signature acceptance may be based on the integrity of the signature. If the signature and the message as a whole are accepted by the central servers, then the servers may then sign the message and pass the message along to receiving systems connected to the emergency response centers.

Alarm and surveillance system 10 also includes reception set 30, which includes one or more receiving systems 70. Receiving systems 70 translate authenticated messages into a form readable by distributing systems. A particular receiving system may be responsible for transmitting the message to several distributing systems. It may not be the responsibility of the distributing systems to handle the message in the form sent by the central server. Thus, the receiving system translates the message to a form useable by the distributing systems. Distributing systems may be devices such as cell phones or personal mobile devices carried by emergency response personnel. Such devices may not be equipped to handle the particular form of message transmitted through alarm and surveillance system 10, even if specific software is built for the system.

In particular, central server 60 will have a universal mechanism of data extraction such as a tailored algorithm, in order to reduce any workload not directly associated with authentication, data extraction, and logging. Devices which exist as endpoints in the communication process will typically be in the form of consumer level electronics. Such devices may not be held responsible for the complete translation of data transmitted by the central server, and may only be expected to handle a reasonable amount of data translation. Such consumer electronic devices may be equipped with hardware and software and may not require more than a few seconds to access external data. These receiving devices may be fully equipped with alarm and surveillance system software for the purpose of translating data sent from the central server into a form which can be transmitted to a number of consumer electronics running alarm and surveillance system software. Thus, the receiving system may translate the message to a form that can be understood by all distributing devices, with the assumption that such devices will be running some form of alarm and surveillance system 10 software. These receiving systems may also be responsible for performing an additional verification of signatures from both the DVR and from the central server.

Further, receiving systems 70 act primarily to handle tasks which contain a level of complexity which may require more time than is permitted for central server 60 to perform a transmission or may be beyond the scope of expectation for a mobile or consumer application. The data sent from the central server to receiving systems 70 may contain keys which can only be used to assemble derivatives through a process which may take a significant amount of time or computation. For example, significant amount of time may be defined as any amount over several seconds, and a significant amount of computation may be defined as any computation which, with moderate probability, will take longer than several seconds on a machine in question. One such derivative may be a list of available response teams derived from geographical coordinates of the sending machine. A number of comparable mechanisms shall be expected to be in place during the alarm and surveillance system 10 transmission process and the tasks are suitable for neither the central server nor the consumer application.

Distribution set 40 may include one or more distribution systems 75, arranged in a set or a series. Distributing systems 75 may present information contained within the messages to the emergency response personnel. The output of the distributing systems may be text and/or video, together displaying the logistical information intended for provision by the A.L.E.R.T. system. The distributed systems may also serve as a means of communication between emergency response personnel and the system itself. Such communication may include communication with the central servers in order to request access to further information from a particular DVR. Such communication may also direct communication with other response personnel tied in with alarm and surveillance system 10. Each distributing system 75 may be designated as such purely on the condition of having specialized alarm and surveillance system 10 software installed or by being registered with alarm and surveillance system 10, and a particular member of alarm and surveillance system 10. Each set of client 15, handling 20, reception 30 and distribution 40 may be programmed with alarm and surveillance system software. All components may be programmed with some form of alarm and surveillance system 10 software.

The system operates so that components of the alarm, camera 45 and primary central server have inbound messaging capabilities to the DVR. The redundant server does not have these capabilities, only primary central server, the receiving system and the distribution system have inbound messaging capabilities to primary central server and distribution system may only interact with the receiving system. The receiving system may only interact with the primary central server, the redundant server and the distribution system. Thus the primary central server may send outbound messages to any component except to the alarms and the cameras 45, which are not configured to receive messages. The emergency responders or other end users only receive messages from the distribution system.

Figure 2A:
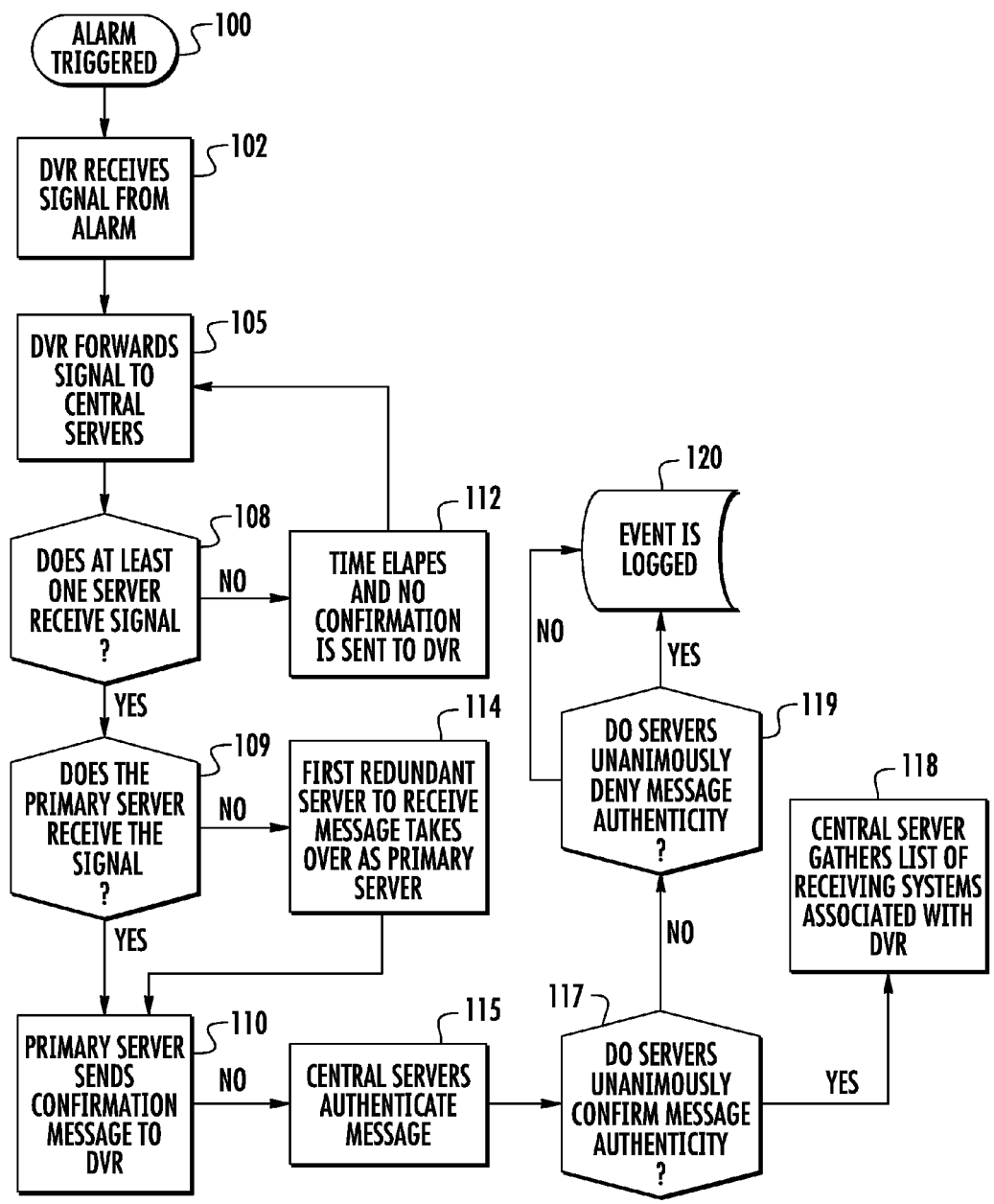
FIGS. 2A-2B illustrate the signal flow through the alarm and surveillance system.
Figure 2B:
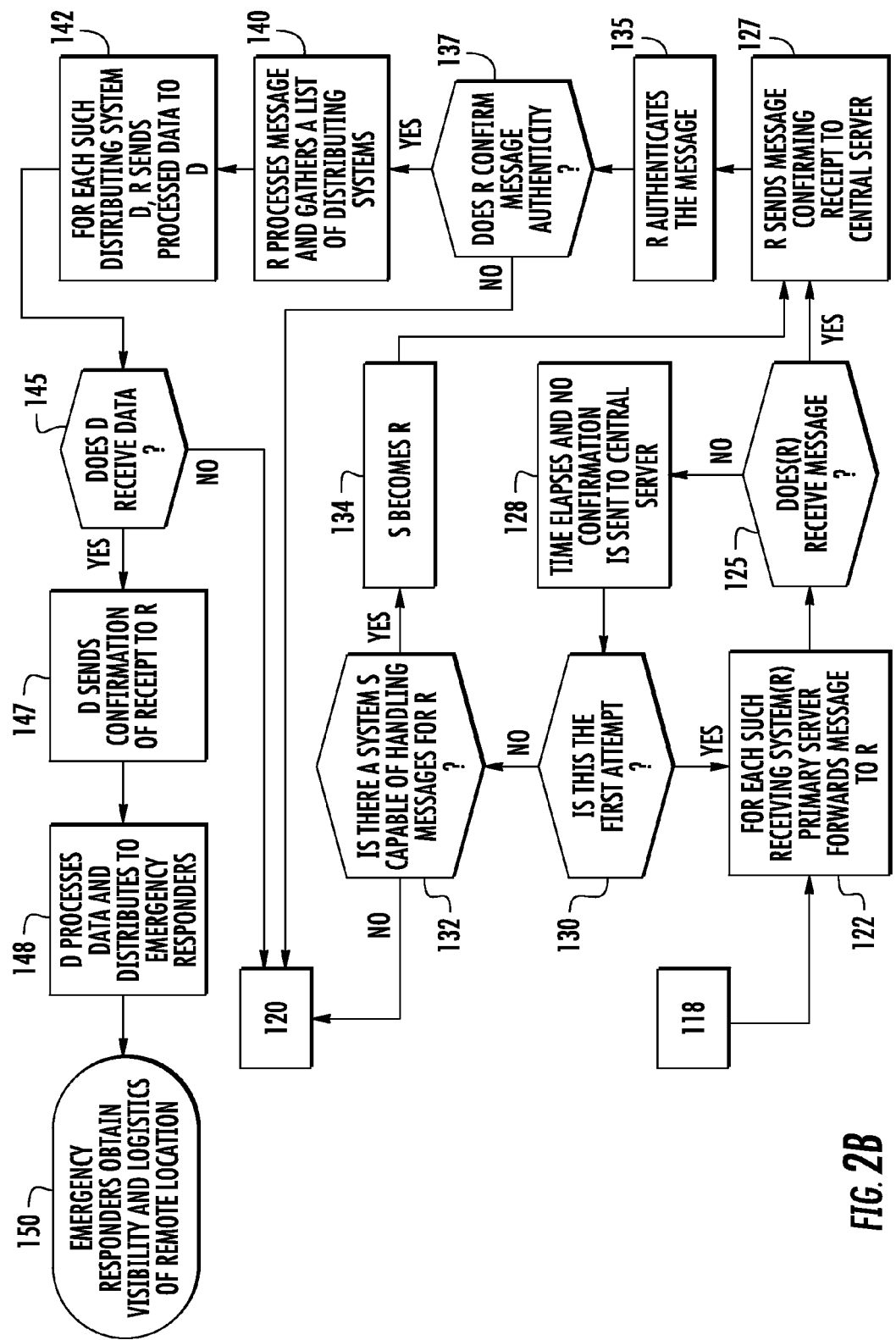

FIGS. 2A-2B illustrate the signal flow through alarm and surveillance system 10. When an emergency event occurs at a client site such as a school, government building, business location, private home or any other location or facility the A.L.E.R.T. system has been installed, alarm may be triggered manually by a person on the scene of the event. A trigger may be mounted directly to the facility such as a panic button or a hand held device associated with the person triggering alarm. Alarm 55 may also be triggered automatically by a detector such as but not limited to a smoke detector, a fire detector, a motion detector, a door or window opening detector, an electric eye or any other such detection device. A step of triggering alarm 55 is indicated at 100 in FIG. 4.

When alarm 55 is triggered, alarm and surveillance system 10 sends a signal to a Closed-circuit television (CCTV) system, which then turns on cameras 45, an Internet broadcast, or video feed storage hardware, such as DVR 50 or a network video recorder (NVR). A network device including video feed storage hardware, which may be DVR 50, then receives a signal from alarm 55 as indicated at 102. As noted in step 105, DVR 50 then forwards a signed signature and video feed information to the central and redundant servers. If at least one server receives the signal from DVR 50 (step 108) and the receiving server is the primary server (step 109), then the primary server sends a confirmation message to the DVR (step 110). Each server is embedded with ALERT software. However, if the signal is not received by at least one server, time lapses and no confirmation is sent to the DVR, as noted in step 112. If a signal is received by a server, but the receiving server is not a primary server, the first redundant server to receive the signal takes over as the primary server as in step 114 and confirmation is sent to the DVR (step 110).

Central servers then authenticate the message that contains data and video information (step 115). If the servers unanimously confirm the authenticity of the message (step 117) the central server then gathers a list of receiving systems associated with DVR 50 as noted in step 118. However, if the servers do not unanimously confirm message authenticity in step 117, the servers may or may not unanimously deny message authenticity in step 119 and the event is logged in step 120.

The authentication process results in a yes or no binary decision. A degree of authentication and integrity such as a 95 percent probability may also be used. The encryption may also use a bit map in the authentication process. A bitmap may use the first six digits to denote a location; the next six digits to denote the user name, the next six digits may denote the password or the number of a CAT card used. A bitmap may in fact be useful to optimize information transmission from the DVR to the central servers, and from the central servers onward. However, other encryption methods of plain text, or otherwise serialized data including, but not limited to, logistical and authoritative information pertaining to system users, may be used or the purpose of data transmission. The makeup of a particular bitmap falls into the classification of implementation.

As shown in FIG. 2B, when the central server gathers a list of receiving systems associated with DVR 50 as noted in step 118 a message is forwarded to each receiving system from the primary server (step 122). If a receiver receives the message as noted in step 125, the receiver sends a message confirming receipt to the central server (step 127). However, if the receiver does not receive a message in step 125 and time elapses with no message sent to the central server in step 128 it is determined whether it is the first attempt to forward the message to the receiver (step 130). If it is the first attempt, the sequence of steps 122, 125, and 127 or 128 is repeated. If it is determined that it is not the first attempt in step 130, it is determined whether there is a system capable of handling messages for the receiver in step 132. If there is not a system capable of handling messages for the receiver, the event is logged 120. If there is a system capable of handling messages, the system becomes the receiver (step 134) and sends a message confirming receipt to the central server (step 127).

Receiving systems then authenticate the message in step 135. In particular, the receiving systems will perform a signature authentication on both signatures, confirming the integrity of both the central servers and the original sender. If the signatures are confirmed in step 137, the receiving systems will process and prepare the data for distribution and gather a list of distributing devices or systems running ALERT software (step 140). For each distributing system the receiver then sends processed data to the distributing system in step 142. If the receiver does not confirm the authenticity of the message in step 137, the event is logged 120.

If it is determined that the distributing system receives the data from the receiver in step 145, the distributing system sends confirmation of receipt to the receiver in step 147. The distributing systems then process and distribute the data to emergency responders (step 148) and emergency responders obtain visibility and logistics of the remote event location through distributing devices in step 150. For purposes herein disclosed, the logistics applies to and refers to any and all information specific to the area where the triggered alarm is presently located. This information may include, but is not limited to, time of day, date, month, year, geographic location, address, latitude, longitude, altitude, elevation, terrain, temperature, humidity, weather, precipitation, traffic and estimated travel time. If it is determined that the distributing system does not receive the data from the receiver in step 145, the event is logged 120.

When the event ends, the video, audio, text and other associated data generated by the system during the course of the event may be stored. The stored information may be accessed and replayed in the short term by persons engaged in responding to the event. The information generated may also be archived as a historical record, where it may be used to train responders or be produced in request by insurance companies, lawyers or other entities with interest in what transpired during the course of the event. The information may also be in a broadcast format to enable news media to access and broadcast the archived information.

Figure 3A:
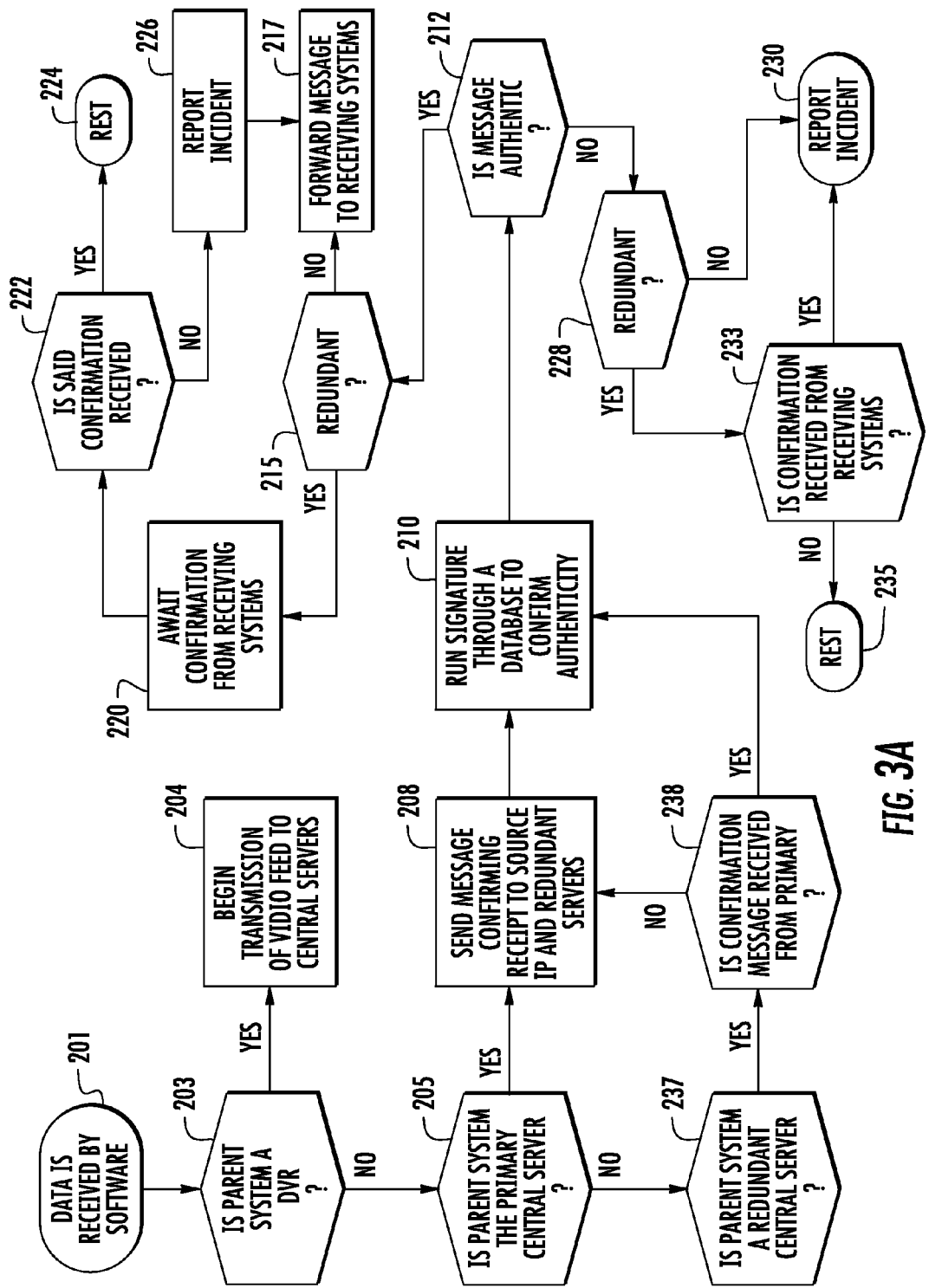
FIG. 3A-3B illustrate the signal flow through the alarm and surveillance system software.
Figure 3B:
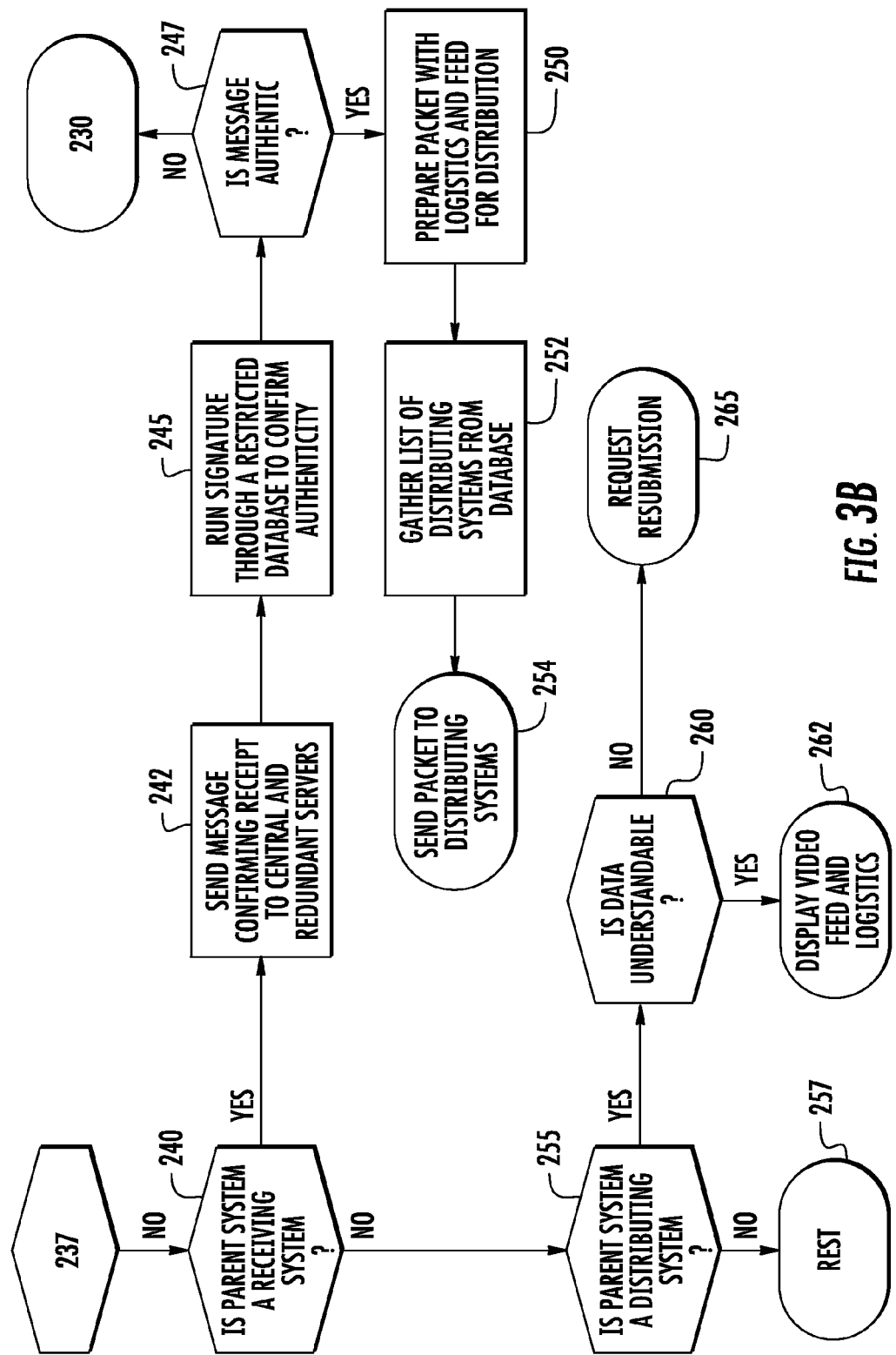

FIGS. 3A-3B illustrate the signal flow through the alarm and surveillance system software. Initially, as shown in FIG.

3A, input data is received by the software in step 201. The software then determines whether the parent source of the data is a DVR in step 203. If the data source is determined to be a DVR in step 203, then the system begins transmission of video feed to the central servers as shown in step 204. If however, the data parent or source is determined not to be a DVR in step 203, then another decision is made to determine if the parent system is the primary central server in step 205. If the parent system is determined to be the central server in step 205, then the system sends a message confirming the receipt to the source IP and the redundant servers in step 208. Then the signature associated with the message and or the parent is compared to signatures stored within a database to confirm the authenticity of the parent in step 210. A determination is made of the authenticity of the message in step 212. If the message is determined to be authentic, then a further test is made in step 215 to determine if the message is redundant. If the message is determined not to be redundant in step 215, then the message is forwarded to the receiving system in step 217. If the message is determined to be redundant in step 215, then the system awaits confirmation from the receiving system in step 220. If it is determined that the confirmation is received in step 222, then the system will rest (step 224). If it is determined that the confirmation is not received in step 222, then an incident report is generated (step 226) and the message is forwarded to the receiving system in step 217.

If it is determined that the message is not authentic in step 212 a further determination is made regarding whether the messages is redundant in step 228. If the non-authentic message is also determined not to be redundant in step 228, then the incident is reported in step 230. If the non-authentic message is determined to be redundant in step 228, then a further determination is made as to whether a confirmation is received from the receiving systems in step 233. If it is determined that confirmation was received by receiving systems in step 233, the incident is reported in step 230. If it is determined that confirmation is not received in step 233, then the system rests (step 235).

The system can be reset after an emergency event. During an emergency event, the system may be limited to interacting with a single user designated by the primary user. Such a safeguard may be used to prevent multiple users from interfering with the integrity of the system immediately following the initiation of an emergency situation. If a user is performing more advanced functionality beyond the operations of the A.L.E.R.T. system, such as viewing the live feed, then the user may be detached from the system to allow for the primary user to take unanimous control over the system during the course for the emergency event. The designated user may be responsible for resetting the system after the emergency has concluded.

If the parent system is determined not to be the primary central server in step 205, then another determination is made as to whether the parent system is a redundant central server in step 237. If the parent system is a redundant server, then a further determination is made regarding whether a confirmation message is received from the primary server in step 238. If it is determined that a confirmation massage is not received in step 238, then a message is sent confirming receipt to the source IP and to the redundant servers in step 208. If it is determined that a confirmation was received in step 238, then the signature is run through a database to confirm authenticity beginning with step 210.

With reference to FIG. 3B, if the parent system is determined not to be a redundant central server in step 237, then another determination is made to decide if the parent system is a receiving system (step 240). If the parent system is determined to be a receiving system in step 240, then the system sends a message confirming receipt to the central and redundant servers in step 242. The signature is then compared with signatures within a restricted database in order to confirm authenticity (step 245). A determination is made of whether the message is authentic in step 247. If the message is determined not to be authentic in step 247, then the incident is reported in step 230. If the message is determined to be authentic in step 247, then the system prepares a packet with logistics and feed for distribution in step 250. After this, the system gathers a list of distributing systems from database (step 252) and sends a packet to distributing systems (step 254). Distributing systems then send confirmation that the message is received and that a responder is in route to the location of the event as reported.

If the parent system is determined not to be a receiving system in step 240, then a further subsequent determination is made as to whether the parent system is a distributing system in step 255. If the parent system is determined not to be a distributing system in step 255, then the system will rest (step 257). However, if the parent system is determined to be a distributing system in step 255, then a further determination is made whether the data is understandable (step 260). If the parent system is a distributing system and the data is understandable, then the system may display video feed and logistics (step 262). If the parent system is a distributing system and the data is not understandable, then a request for resubmission may be prepared or generated automatically in step 265.

Figure 4A:
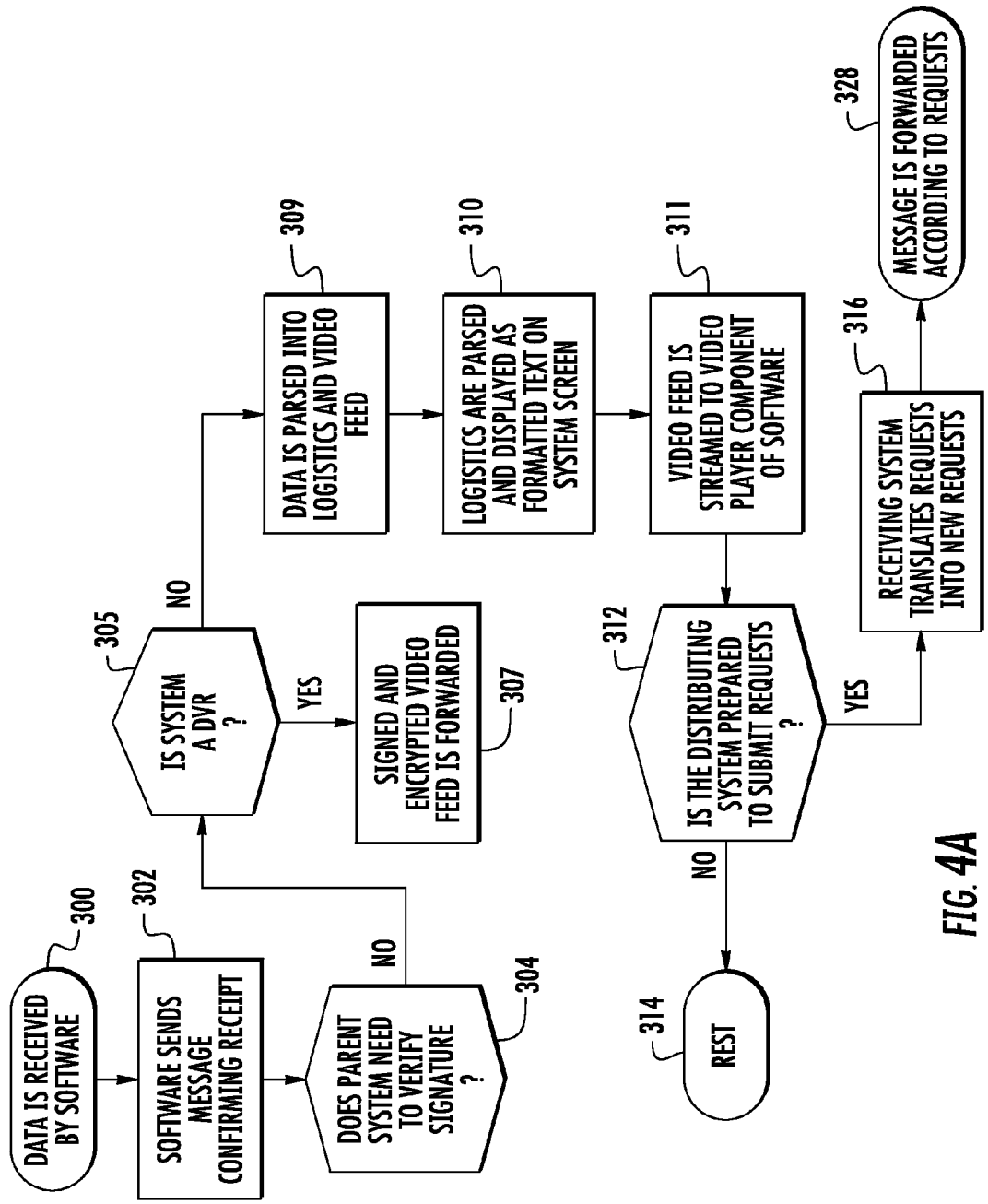
FIG. 4A-4B illustrate the processing of data through the alarm and surveillance system.
Figure 4B:
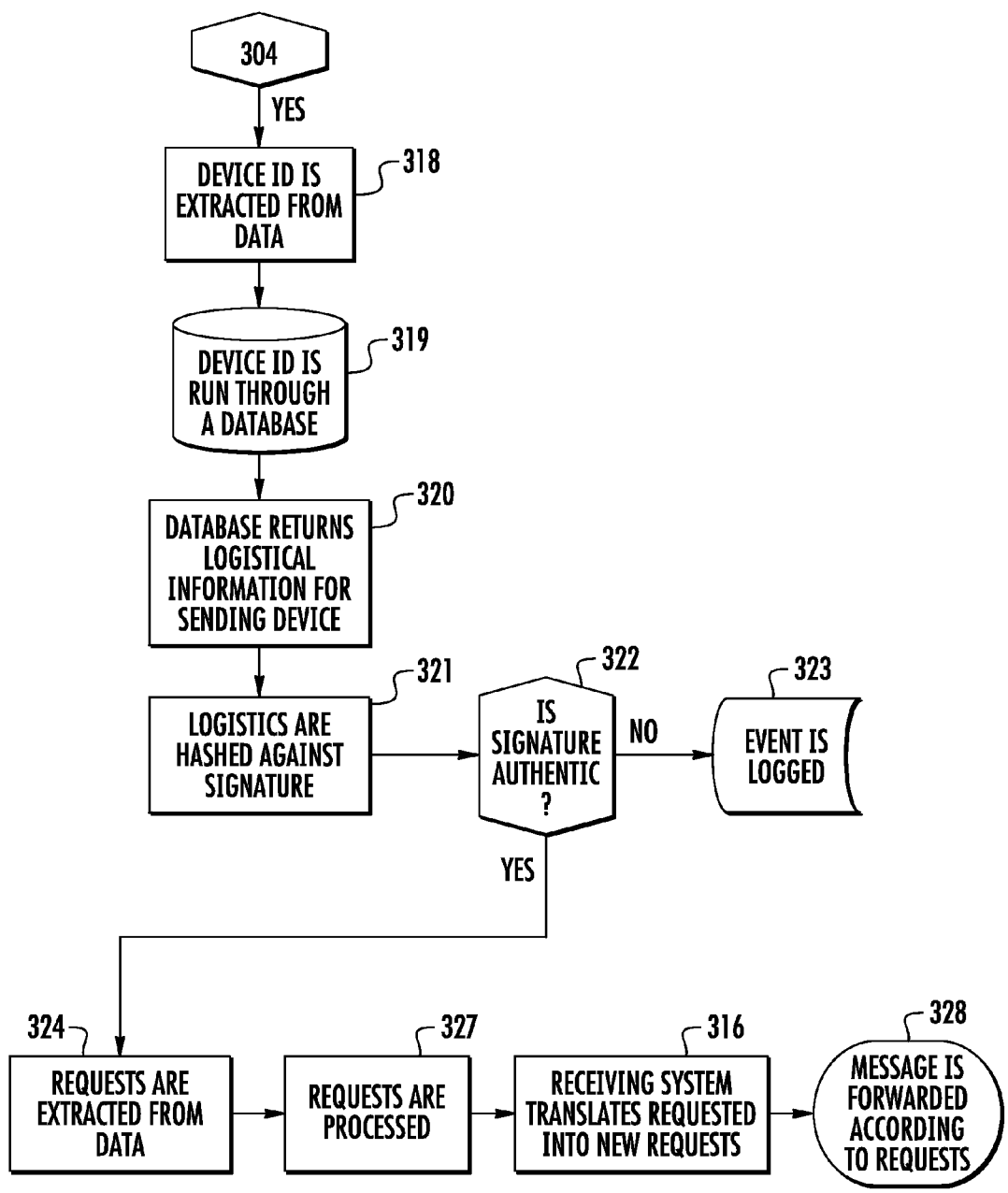

FIGS. 4A-4B illustrate the processing of data through the alarm and surveillance system. Initially, as shown in FIG. 4A, data is received by the software in step 300. After the data is received, the software initiates a message which is sent confirming the receipt of the data in step 302. Then a determination is made regarding whether the parent system needs to verify a signature in step 304.

If a determination is made that the parent system does not need to verify the signature (step 304), then a further determination is made regarding whether the system is a DVR (step 305). If the system is a DVR, then the signed and encrypted video feed is forwarded in step 307. However, if the system is determined not to be a DVR in step 305, then the data is parsed into a logistics and video feed in step 309. Afterwards, the logistics are parsed and displayed as formatted text on the system screen in step 310. Then the video feed is streamed to a video player component of the software (step 311). A determination is then made regarding whether the distributing system is prepared to submit requests in step 312. If the system is not prepared to submit the requests, then the system rests (step 314). If the distributing system is prepared to submit requests, as determined in step 312, then the receiving system translates the requests into new requests in step 316. Finally the message is forwarded according to the requests in step 328.

If it is determined that the parent system does need to verify the signature in step 304, then the device ID is extracted from the data in step 318. The device may be the DVR or central server. The device ID is then compared with all IDs stored within a database in step 319. The database then returns logistical information regarding the sending device 320. Then logistics are compared or hashed against the signature 321. Next a determination is then made regarding whether the signature is authentic 322. If the signature is determined to be non-authentic in step 322, then the event is logged in step 323. However, if the signature is determined to be authentic in step 322, then the requests are extracted from the data (step 324) and the requests are processed in step 327. The receiving system then translates the requests into at least one new request in step 316 and the message is forwarded according to the requests in step 328.

While the A.L.E.R.T. alarm system has been described with reference to particular embodiments, it is understood that various modifications can be made to the above described alarm system. The A.L.E.R.T. system may be adapted to a plurality of security applications beyond premises security. For example, the A.L.E.R.T. system may be adapted to provide security for automotive, aviation or nautical assets. Thus, all such modifications of the embodiments are intended to be encompassed as falling within the spirit and scope of the above described embodiments and the appended claims.

The invention claimed is:

1. An alarm and surveillance system for alerting a designated user of the alarm and surveillance system of an event occurrence, the alarm and surveillance system comprising:
    an alarm, an image capture device, and a recording device;
    a central server including a primary server and a plurality of redundant servers, wherein the primary server is configured to receive a message from the recording device and verify an authenticity of the message, and wherein each of the plurality of redundant servers is also configured to receive the message from the recording device and verify the authenticity of the message, wherein if the primary server deems the message to be authentic and, simultaneously, at least one redundant server of the plurality of the redundant servers deems the message to be inauthentic, then the at least one redundant server takes over as a new primary server and the primary server undergoes an automatic investigation by a remaining plurality of redundant servers;
    a receiving system for receiving and translating the message from the central server; and,
    a distributing system including at least one device viewable by the designated user.

2. The system of claim 1, wherein the central server includes a database containing information configured to be extracted using a signature included in the message received from the recording device, said information including logistical information relating to the recording device and a list of receiving systems configured to receive the message.

3. The system of claim 1, wherein the primary server authenticates a signature included in the message received from the recording device, processes the signature through a database, collects logistical data relating to the recording device, determines a receiving system to which to forward the message, and defends access to the recording device within the alarm and surveillance system.

4. The system of claim 1, wherein the primary server performs a signature verification of the recording device.

5. The system of claim 4, wherein each of the plurality of redundant servers performs the signature verification of the recording device.

6. The system of claim 1, wherein the message is encrypted and decrypted.

7. The system of claim 1, wherein the central server determines a recipient of the message.

8. The system of claim 7, wherein the central server determines the recipient of the message based on a proximity of the recipient to location of the recording device.

9. The system of claim 8, wherein the central server determines the recipient of the message based on expertise of the recipient.

10. The system of claim 1, wherein the message comprises a signature, and the primary server and each of the plurality of redundant servers verify the authenticity of the message by comparing identity information of the recording device, included in the signature, with an announced identity of the recording device.

11. The system of claim 1, wherein if the primary server does not receive the message and, simultaneously, at least one of the plurality of the redundant servers receives the message, then the at least one server of the plurality of redundant server takes over as a new primary server and the primary server undergoes automatic investigation by a remaining plurality of redundant servers.

* * * * *